(12) United States Patent
Donnelly

(10) Patent No.: US 9,022,078 B2
(45) Date of Patent: May 5, 2015

(54) FLEXIBLE DUCT AND MEANS OF PRODUCTION

(76) Inventor: William James Donnelly, Melbourne (AU)

( * ) Notice: Subject to any disclaimer, the term of this patent is extended or adjusted under 35 U.S.C. 154(b) by 374 days.

(21) Appl. No.: 12/928,258

(22) Filed: Dec. 8, 2010

(65) Prior Publication Data
US 2011/0146828 A1      Jun. 23, 2011

Related U.S. Application Data

(62) Division of application No. PCT/AU2008/000936, filed on Jun. 26, 2008.

(51) Int. Cl.
| F16L 11/24 | (2006.01) |
| F16L 9/00 | (2006.01) |
| B29C 53/78 | (2006.01) |
| F16L 59/153 | (2006.01) |
| F24F 13/02 | (2006.01) |

(52) U.S. Cl.
CPC .............. *F16L 9/003* (2013.01); *B29C 53/78* (2013.01); *F16L 59/153* (2013.01); *F24F 13/0218* (2013.01); *F24F 13/0245* (2013.01); *F24F 13/0263* (2013.01)

(58) Field of Classification Search
CPC ........ B29C 53/78; F16L 59/153; F16L 9/003; F24F 13/0218; F24F 13/0263
USPC .......................... 138/129, 149, 133, 144, 153
See application file for complete search history.

(56) References Cited

U.S. PATENT DOCUMENTS

| 3,554,237 | A | * | 1/1971 | Pelley et al. ................... 138/122 |
| 3,916,953 | A | * | 11/1975 | Nagayoshi et al. ........... 138/129 |
| 4,299,641 | A | * | 11/1981 | Kelly ............................. 156/143 |
| 5,607,529 | A | * | 3/1997 | Adamczyk et al. ........... 156/143 |
| 5,795,634 | A | * | 8/1998 | Fukui ........................... 428/36.1 |
| 5,806,567 | A | * | 9/1998 | Fukui et al. ................... 138/132 |
| 6,076,561 | A | * | 6/2000 | Akedo et al. .................. 138/149 |
| 6,179,009 | B1 | * | 1/2001 | Fukui ............................. 138/149 |
| 6,237,642 | B1 | * | 5/2001 | Lepoutre ....................... 138/129 |
| 6,250,339 | B1 | * | 6/2001 | Ikegami et al. ............... 138/149 |

* cited by examiner

Primary Examiner — Patrick F Brinson

(57) ABSTRACT

A helically formed flexible duct primarily directed to applications in ducted heating, ventilating and air conditioning, of three dimensions including a predetermined length, an inner diameter reinforced with a helically laminated wire member between self laminating substrate, an outwardly radial compartment formation constructed with strip portions of substrate material which form gaps to accommodate outwardly expanding radial dimensions and containing an insulating member, and an outer covering member delivered to a larger radial circumference at an applied circumferential speed exceeding the circumferential speed of the inner diameter substrate tube formation rate.

26 Claims, 14 Drawing Sheets

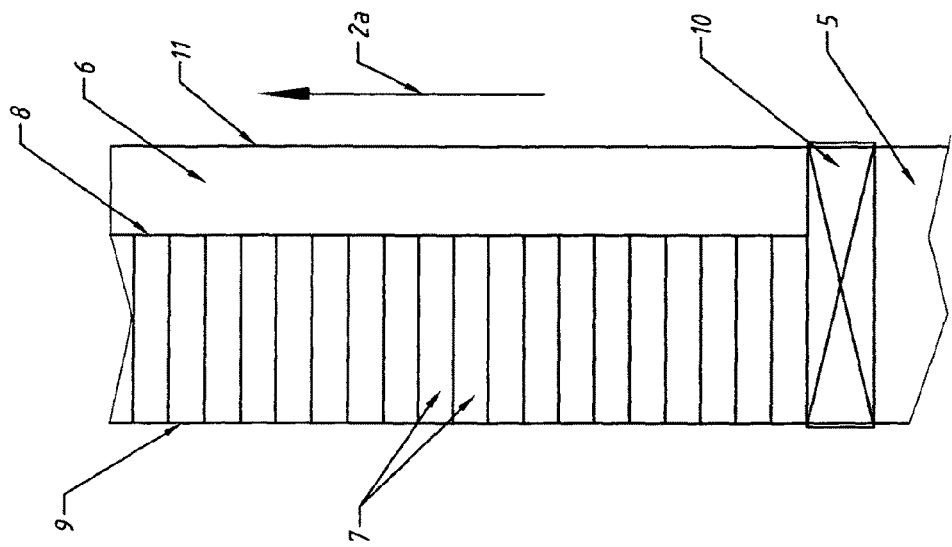
FIGURE -2-
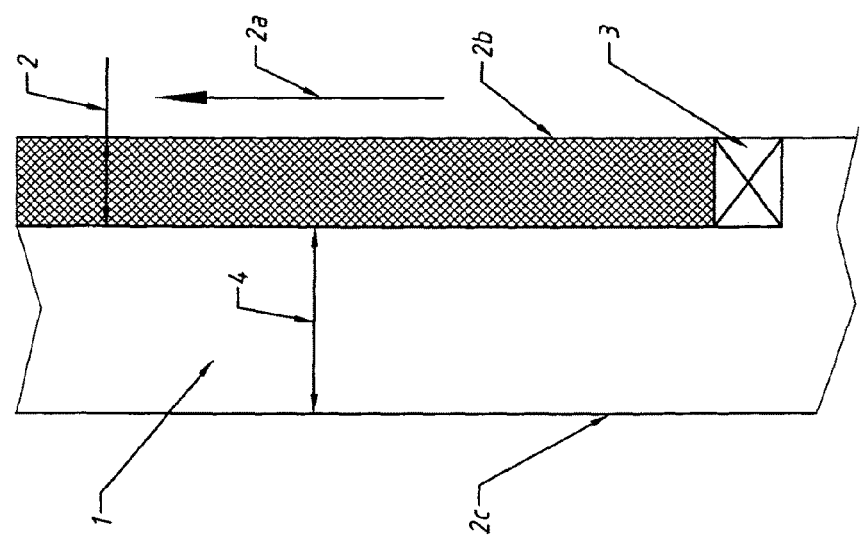
FIGURE -1-

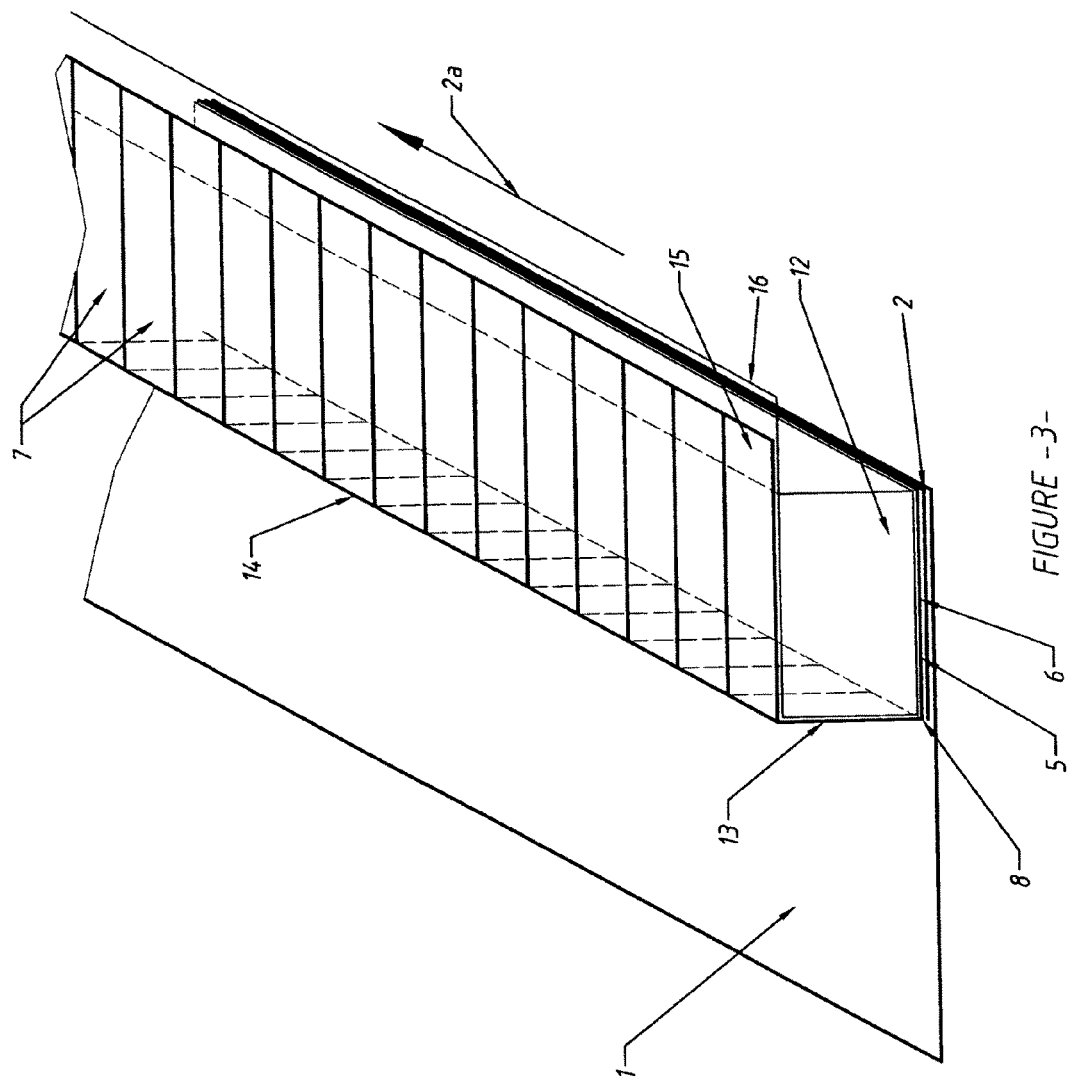
FIGURE -3-

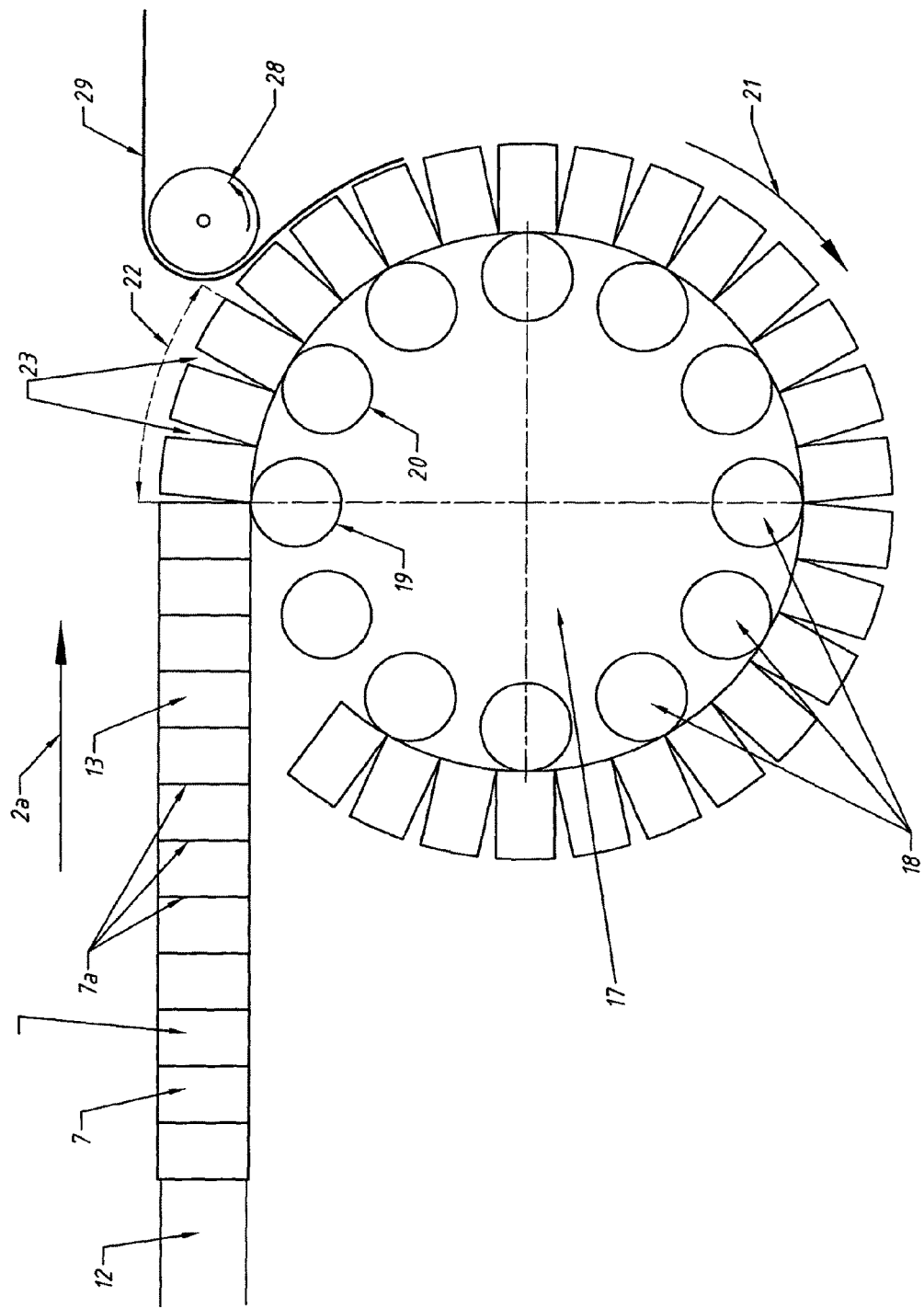
FIGURE -4a-

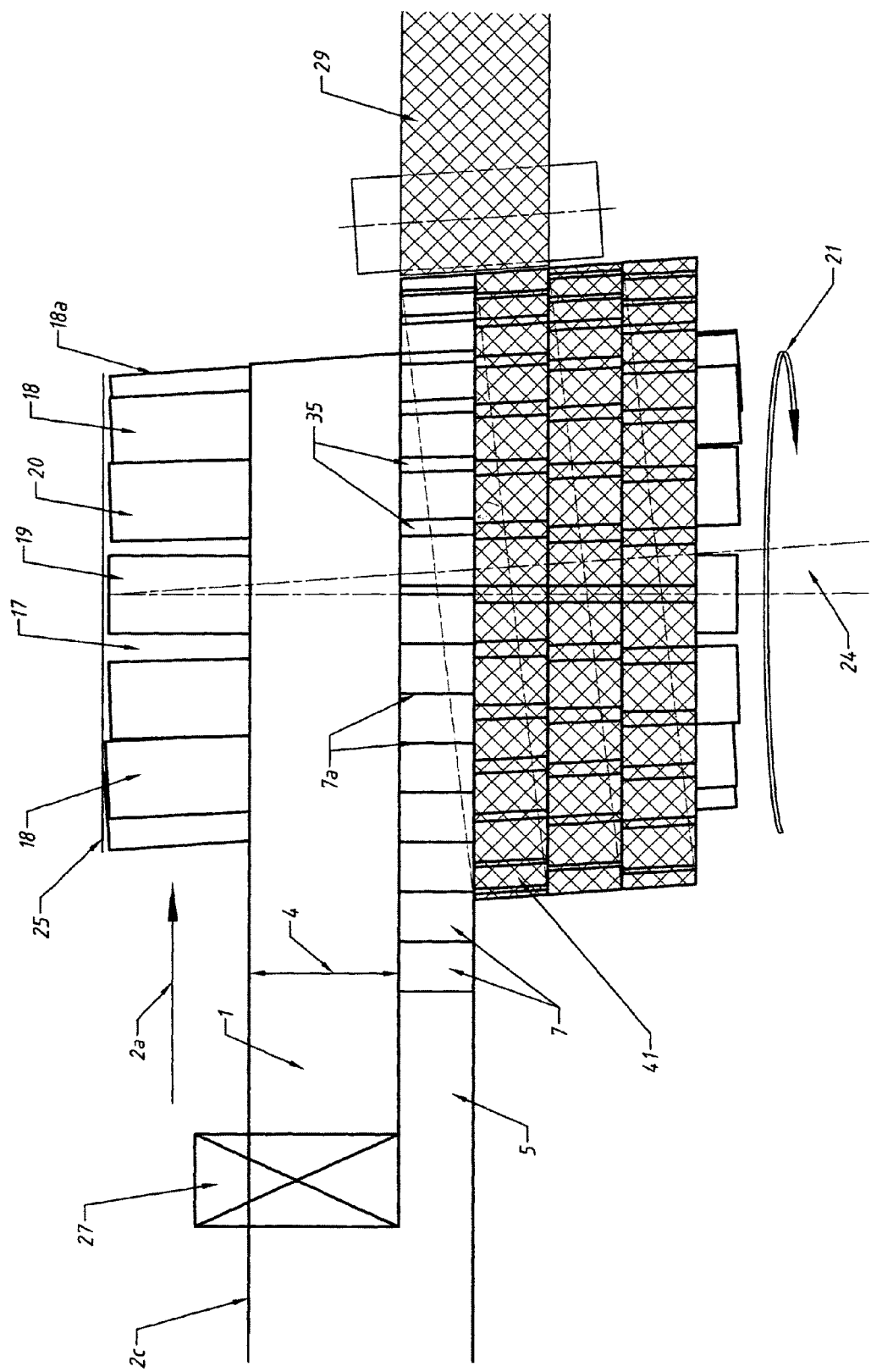
FIGURE -4b-

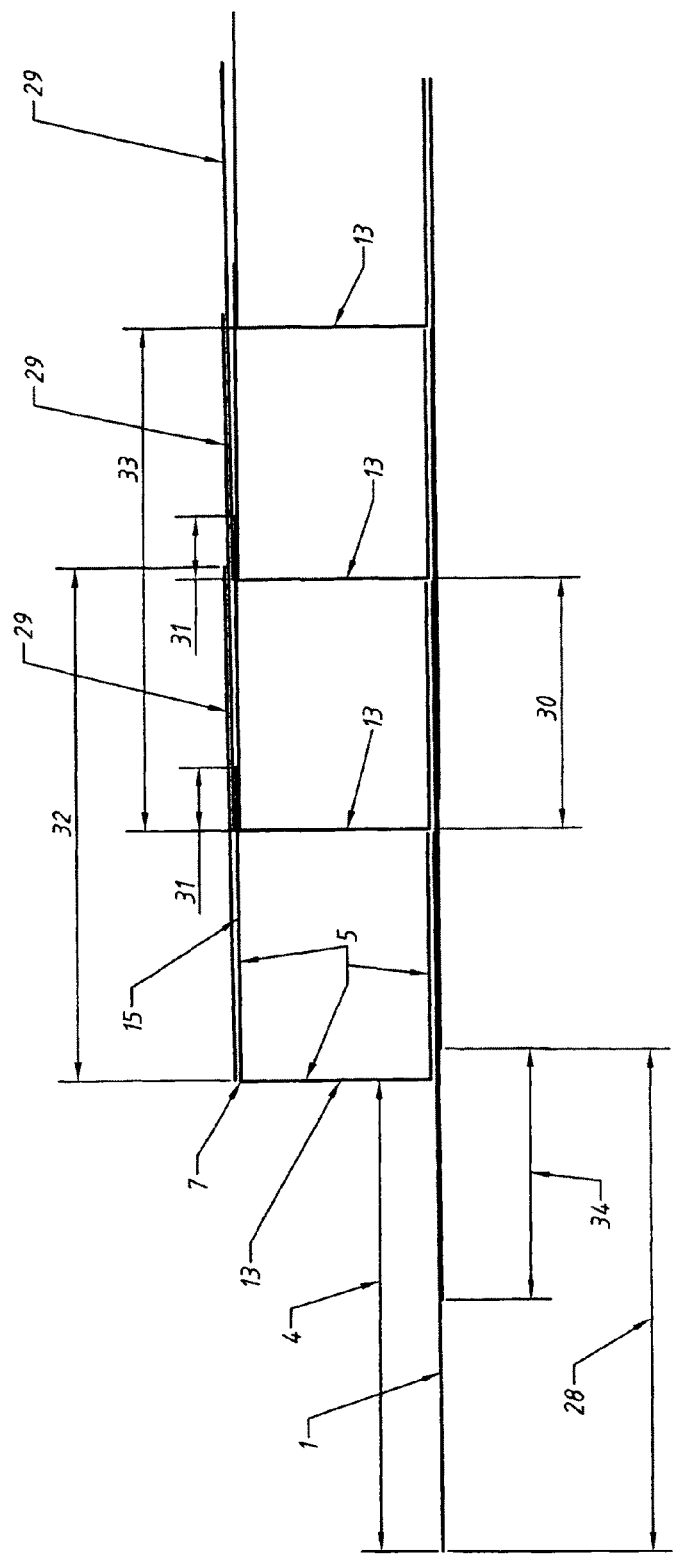
FIGURE -5-

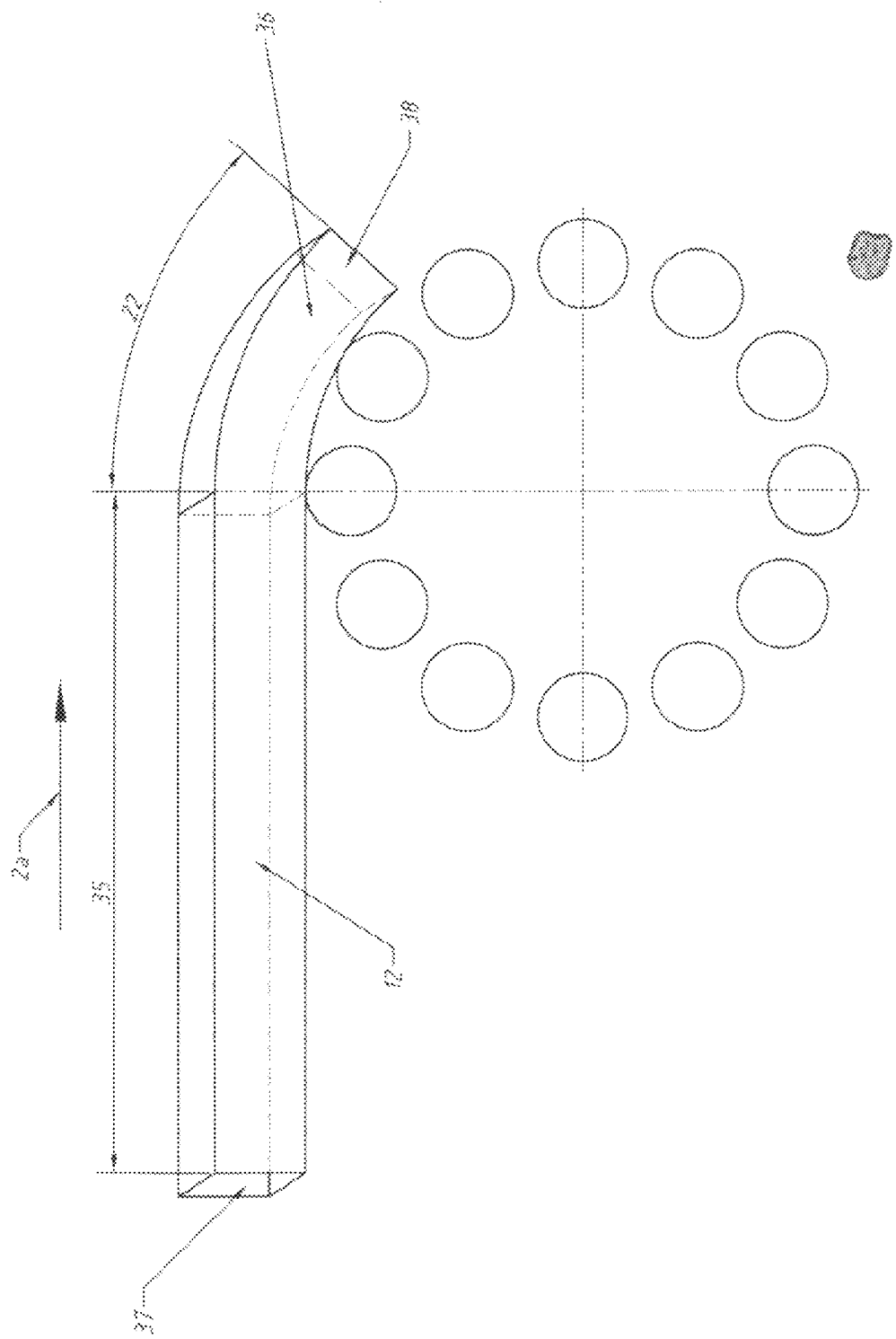

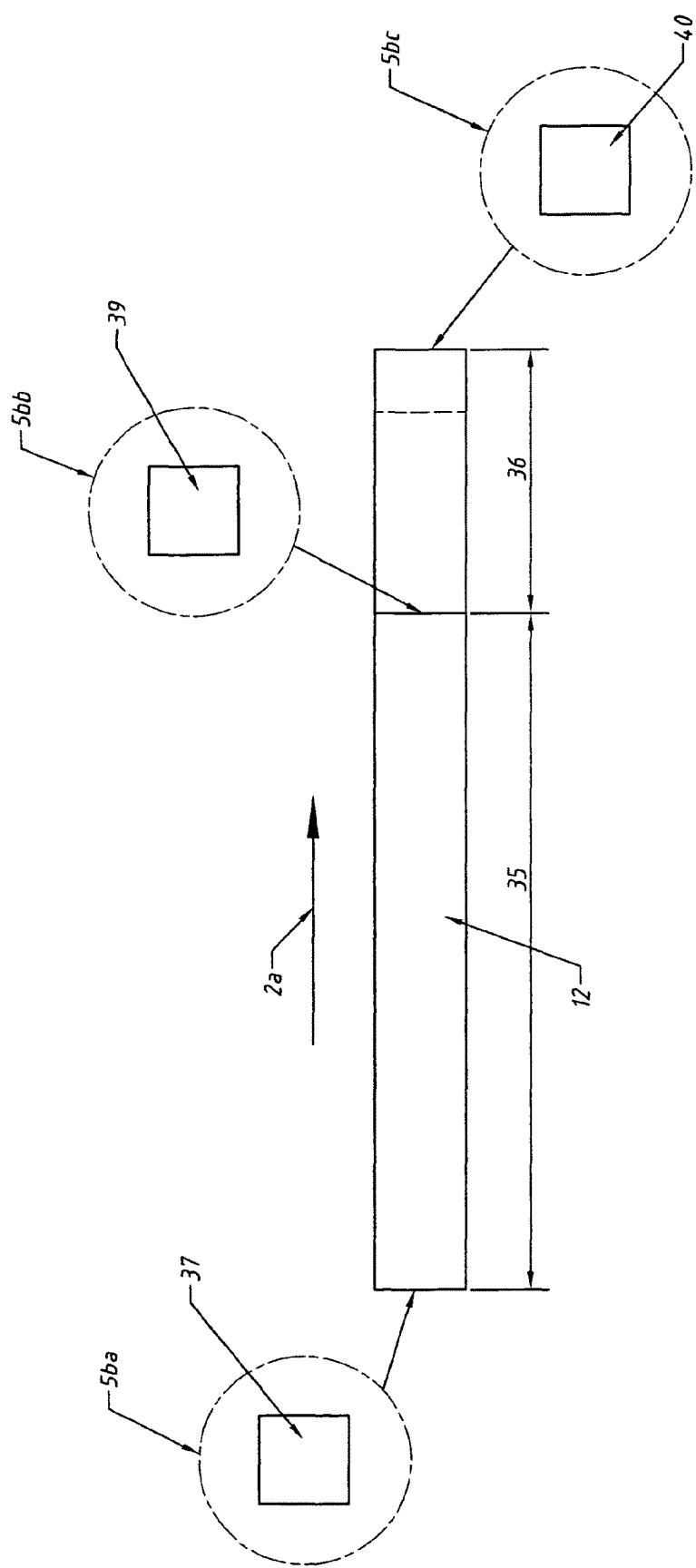
FIGURE -5b-

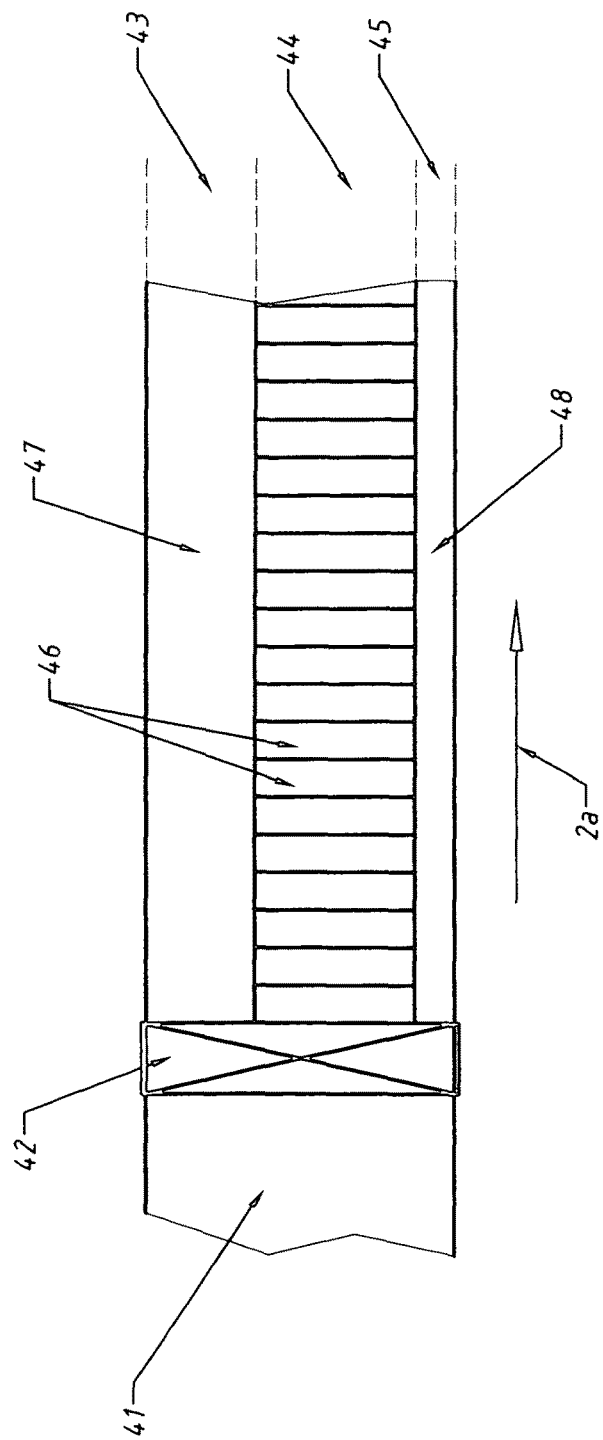
FIGURE -6-

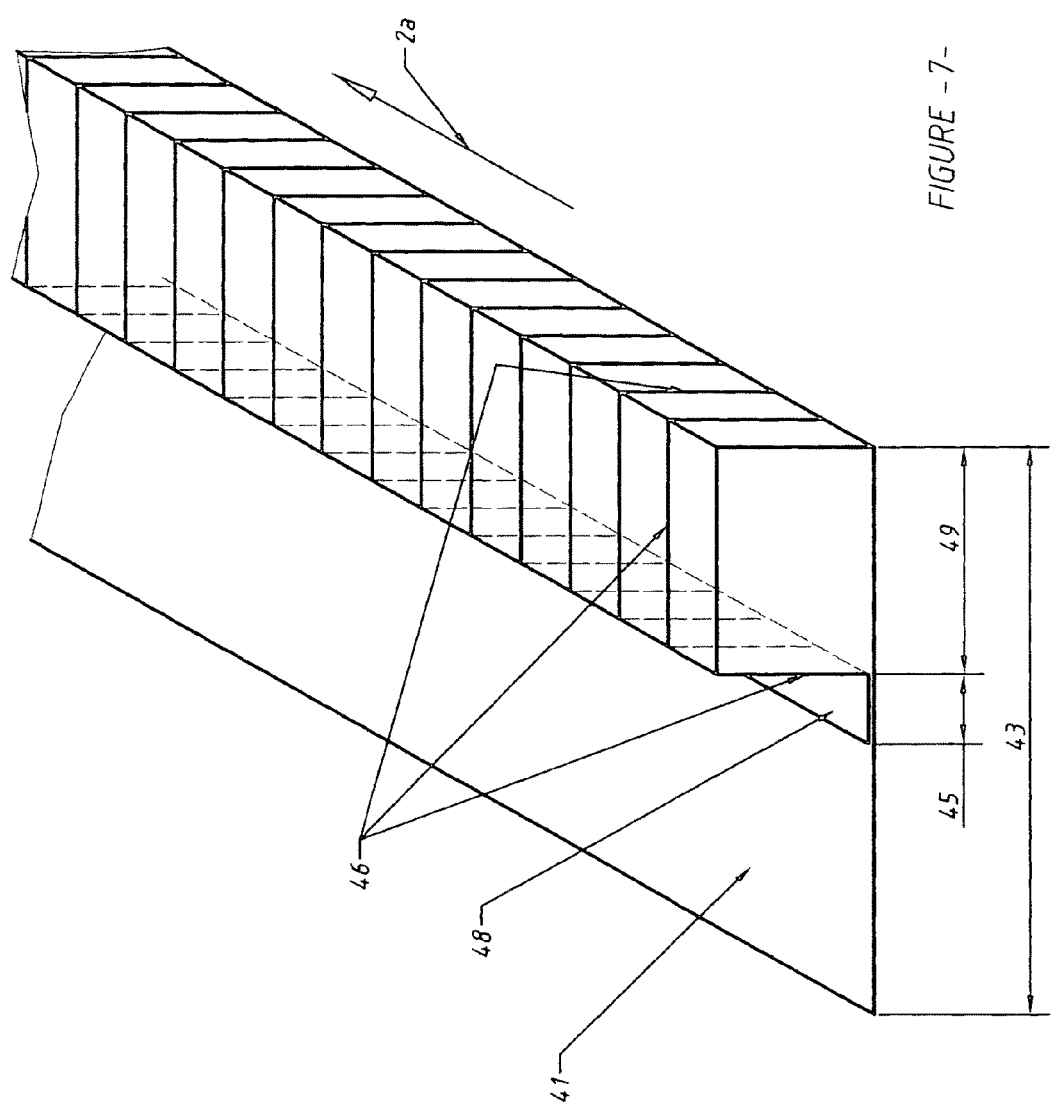
FIGURE -7-

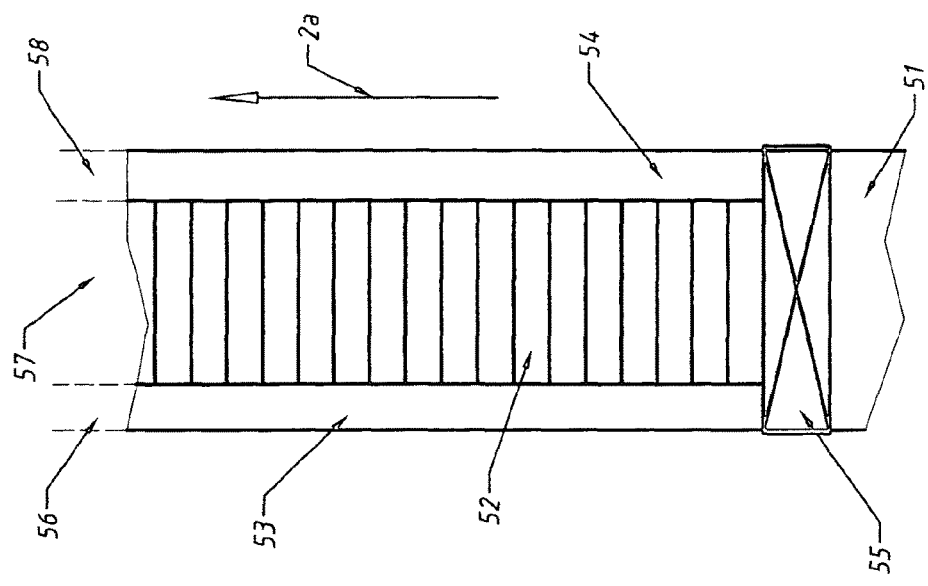
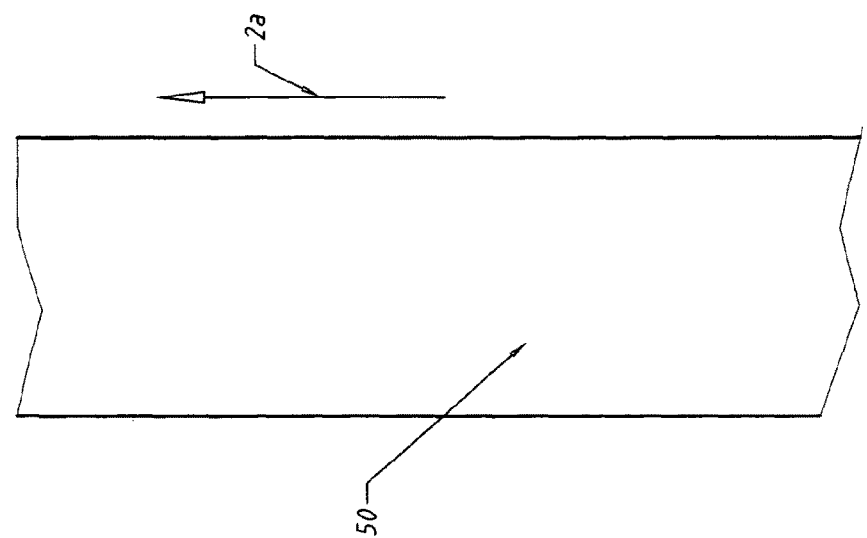

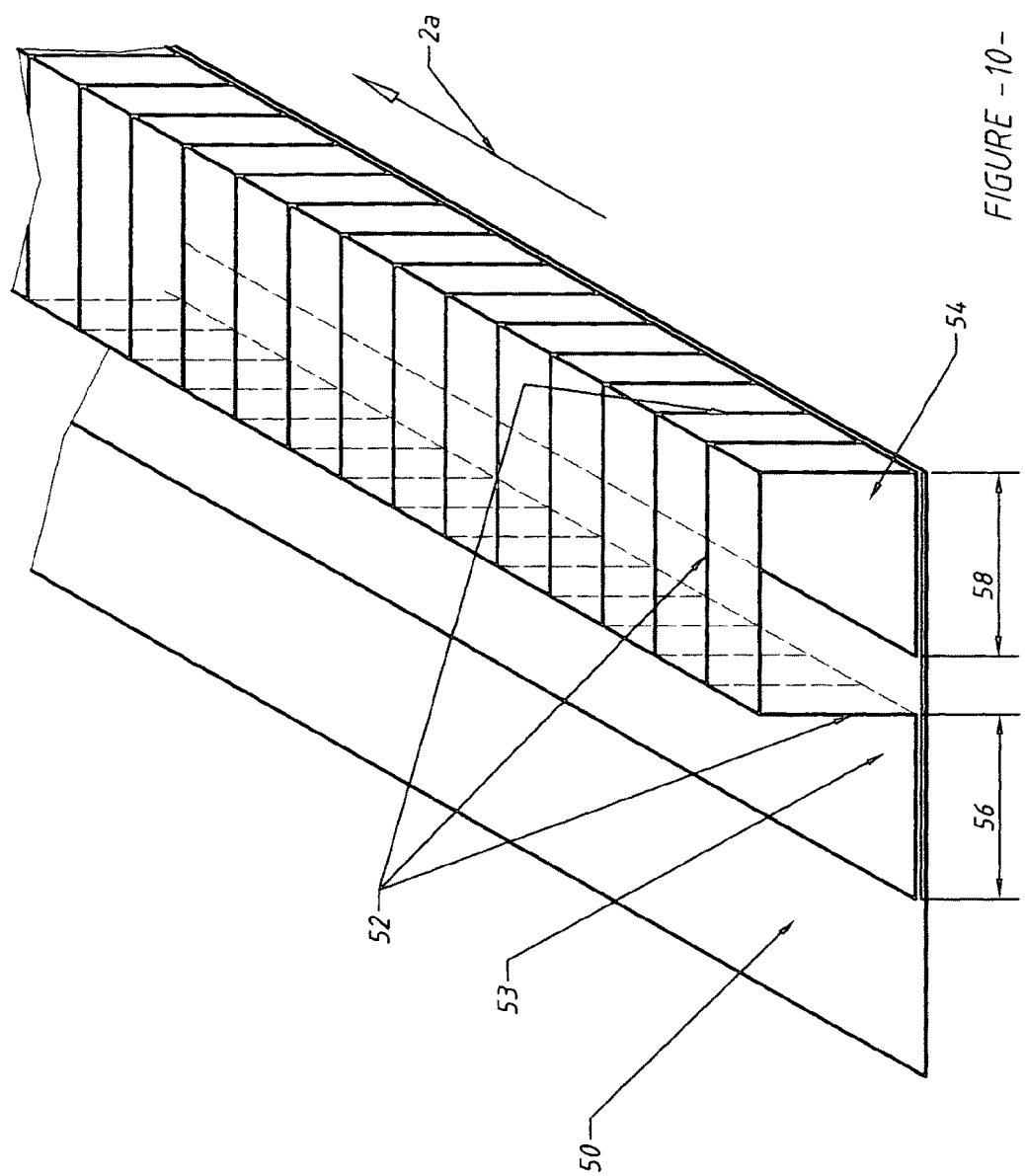

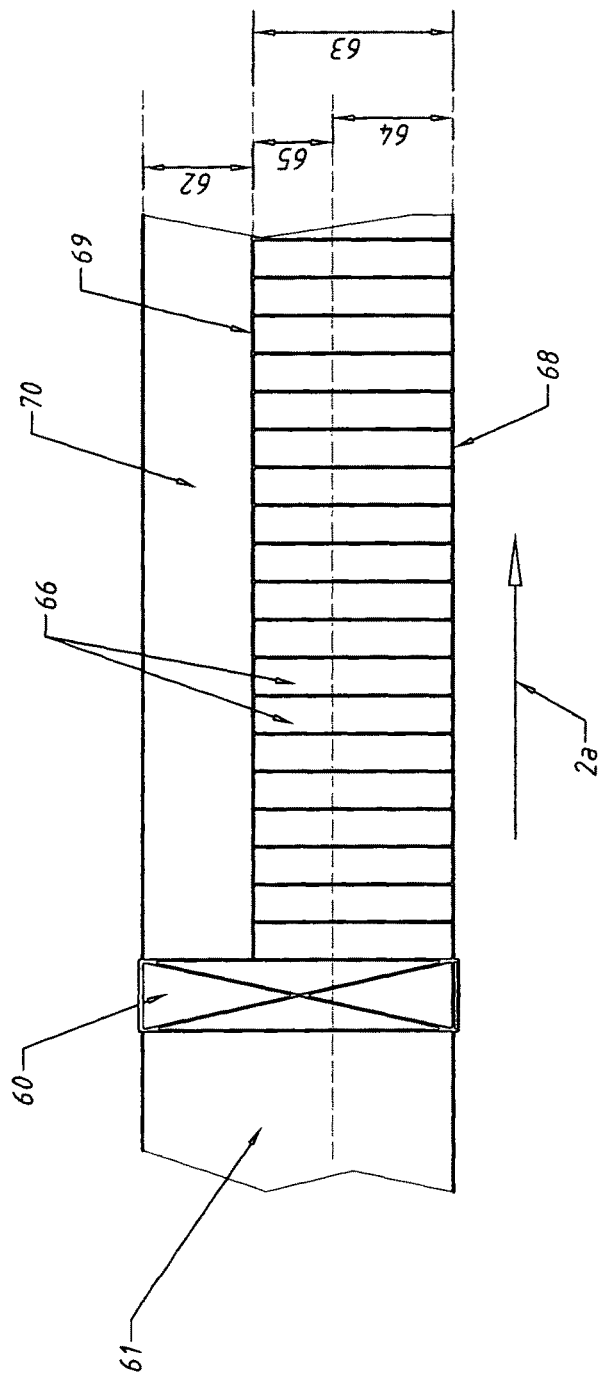
FIGURE -11-

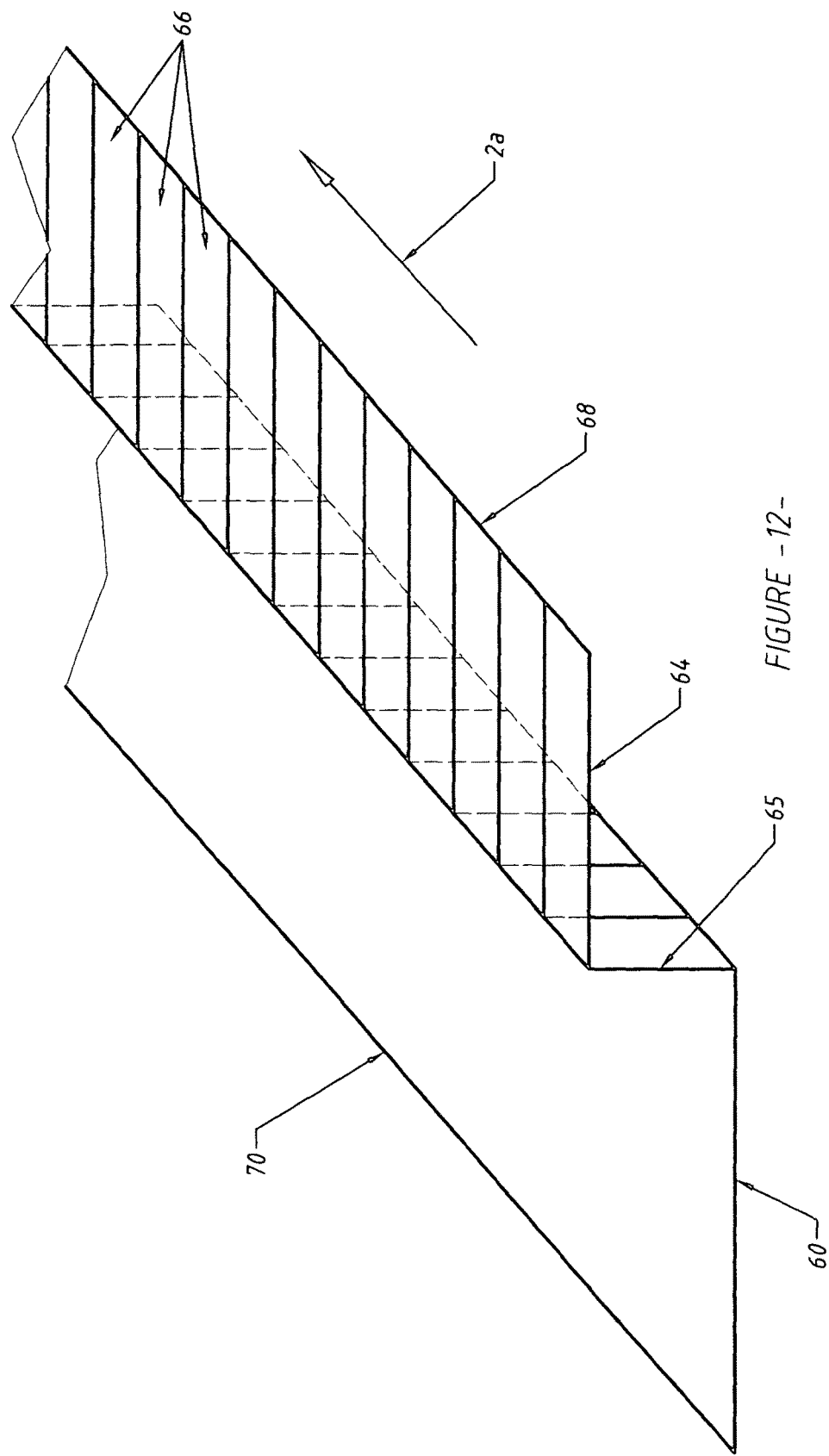
FIGURE -12-

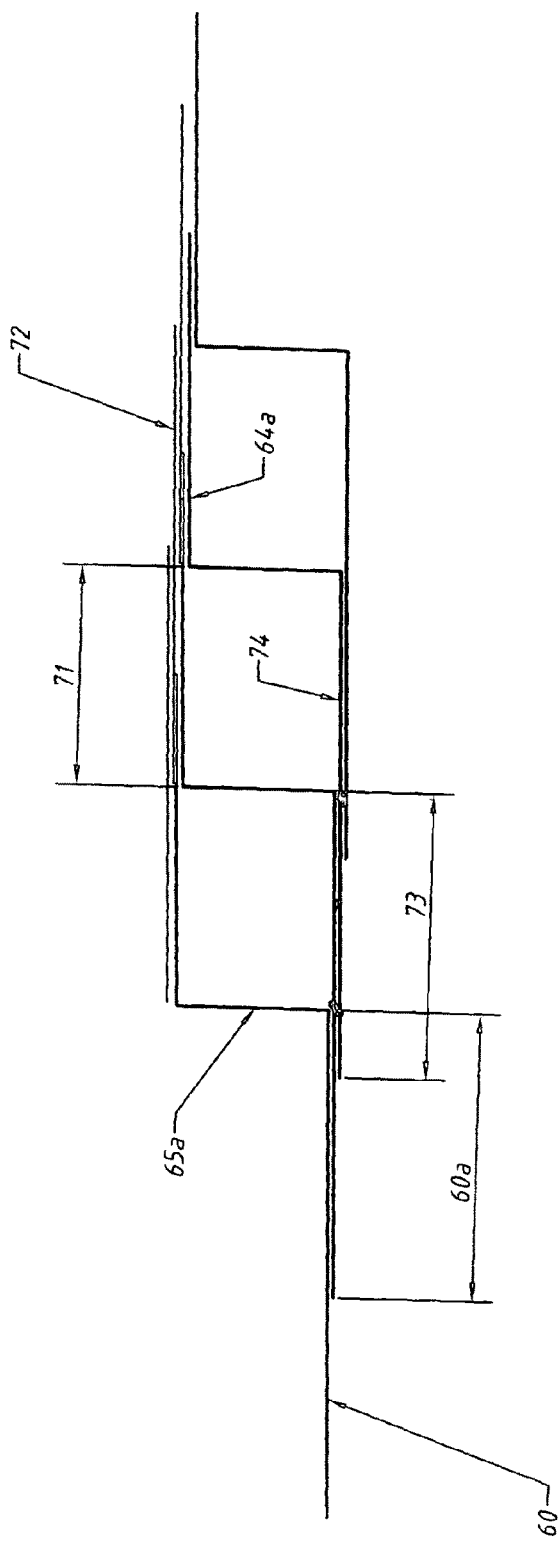

FLEXIBLE DUCT AND MEANS OF PRODUCTION

PRIOR ART

This invention relates to flexible ducting, more particularly known within the art of manufacturing flexible ducting as 'flex-duct'. Flex-duct is commonly employed in the distribution of energised air within ducted heating, ventilation and air conditioning (HVAC) systems, installed in residential, commercial and industrial buildings to provide temperate living and working conditions. Other construction outcome applications include the safe storage of sensitive materials and commodities against adverse ambient conditions.

One common and known means of flex-duct widely available within the field of HVAC applications employs a three stage method of production wherein, an inner tube is formed from a flexible substrate, helically laminated with a continuous wire member inserted between the laminating helical substrate to form a reinforced tube means. A second process involves encasing the tube means within a preformed fibre insulating blanket means to provide thermal protection for the conditioned air passing through the tube means. A third process follows to secure the fibre insulating blanket to the tube means by encasement of an outer covering jacket means, usually a plain or laminated extruded plastics film tube.

Australian Patent No. 773565 of 20 Sep. 2000 describes a further means of flex-duct production, wherein the above-mentioned three stage manufacturing process may be substituted by a single machining process. In this iteration, a single substrate is formed to resemble a 'P' shaped profile, incorporating a hollow portion that may be employed to contain an insulation means such as loose insulating fibre. Further in this iteration, the patent describes a means of reconciling the circumferential difference in length between the interior circumference of the inner diameter (being the nominal bore of the flex-duct) and the length of the outer circumference (being the outer diameter including the thickness of the insulation). This patent describes a means of applying heat to the portion of the substrate material containing the fibre insulation means such that the substrate material (usually a form of plastics film, for example polyethylene) softens to a degree where lineal expansion may occur in conjunction with the pressurised gas (usually air) delivering the fibre insulation means.

U.S. Pat. No. 3,554,237 of Jan. 12, 1971, discloses a wire reinforced insulated flexible hose with several layers of flexible substrates that may include reflective surfaces (16) and a resilient insulating fibre insulating strip (12) and outer covering strip (36) helically laminated with wire (31) entwined between laminates with applied adhesives. This patent does not appear to reconcile the circumferential length differences between ID & OD.

U.S. Pat. No. 5,607,529 describes a means of adding an insulation strip of fibrous (preformed) material to a flexible core tube (30) after the core tube has been independently produced.

U.S. Pat. No. 5,526,849 (to W. R. Gray) describes a means of producing non-insulated flex-duct core with a combination of wire (40) and yarn (50) reinforcements for specialised applications.

As the cost of energy has increased and consumers are becoming more conscious of the need to employ available energy sources frugally for environmental reasons, the flex-ducts commercially available for deployment in residential and commercial HVAC systems have proven sub-optimal. Thermal insulation blanket is known to perform at lower than tested thermal values when formed to cylindrical shape about flex-duct core tube. Many flex-ducts, during installation, are placed across rafters, fitted tightly against flat surfaces or laid on rough surfaces present under flooring. All of these in-situ circumstances compress the insulation blanket and increase thermal losses. In other known circumstances, the outer sheath securing the insulating blanket may loosen allowing thermal losses to occur through lineal or circumferential gaps.

SUMMARY OF THE INVENTION

It is therefore an object of this invention to provide an improved flexible duct and means of production which overcomes one or more of the aforementioned disadvantages of known flex-ducts.

It is a further object of this invention to provide a flexible duct with improved thermal performance to alleviate known causes of energy losses.

It is a still further object of this invention to employ modern digitally controlled production means to reduce the production and labour costs by producing an insulated flexible duct in one automated machining process.

According to one aspect of the invention a first substrate strip material is advanced towards a helical winding mandrel about which a laminated helical tube formation may proceed. A wire reinforcement member, preferably of spring steel quality, advances and is laid between layers of the first substrate as helical overlays occur during rotations about the helical mandrel means. Preferably, the first substrate material has a width of at least two helix spaces. Lamination is preferably secured by adding an adhesive material to the outer surface.

A second substrate strip material is provided to be formed into a compartment designed to receive an insulating means in the form of loose insulating fibres propelled into the compartment portion by an energised air stream. Alternative means of providing an insulation medium within the compartment of the invention will be obvious to those skilled in the art. For example, glass fibres or synthetic fibres with insulating properties may be pre-processed into a sliver formation, similar to sliver employed in textile applications, and simply drawn linearly with the substrate materials and guided within the compartment formation. Further, natural or synthetic polymers may be pre-manufactured as flexible expanded foam extrusions and linearly guided to position within compartment formation.

As the second substrate advances towards the helical mandrel means, mechanical shearing means are provided to cut regular cut lines across a portion of the width of the second substrate.

These cut lines produce a series of horizontal strip portions and emanate from the trailing edge (the rear edge observed by a forward progression of a helixing tube formation after rotation around helical mandrel means) to leave a stable portion approximately one helix width on the leading edge. This stable portion is adhered to, and above the leading edge of the first substrate portion. Preferably, a guide means is provided to prevent the remaining pre-cut strip portions from coming in contact with the (now) adhesive coated surface of the underlying and advancing first substrate. As bonding occurs between the stable portion of the second substrate and the underlying first substrate, a hollow compartment shaping guide means is provided to allow a second outer shaped guide means to cause the strip portions of the second substrate to re-orient to a partial compartment formation about the hollow compartment guide means.

Generally the hollow compartment shaping guide means has a dual purpose in this process. Preferably, this guide means is formed to a square or rectangular shape with the outer dimensions defining a tolerance measurement of the compartment dimension to carry a filling of fibrous material provided to insulate the forming flex-duct product. Further, a hollow centre within the guide means allows passage of the fibrous insulating material to enter the compartment portion at the completion of its formation. The outer second guide means progressively lifts the flap portions vertically to at least the height of the vertical wall of the square or rectangular, hollow compartment guide means.

Further and progressively, as the combined first and second substrates advance towards the helical mandrel means, the remaining portion (eg the strip portions) are guided by the second outer guide means to lay across the upper horizontal face of the inner hollow guide means and an end view profile of generally 'h' formation laid 90 degrees (backwards) emerges. The three-sided hollow portion at the base of the 'h' profile generally defines the compartment portion.

The purpose of dividing the portion of the second substrate which is guided by the second outer guide means to form a compartment shape about the first hollow compartment guide means into a series of strip portions will now become apparent. Whenever a three-dimensional profile or configuration is drawn into a circular path, such as orbiting a helical mandrel to a continuous tube formation, consideration must be given to the creation two separate circumferential measurements. The first measurement is defined by the nominal bore of the tube being so formed, the inner diameter. Normally, a flex-duct is produced as a simple two dimensional flat tube formation to which the thickness of a wall structure is added at later production stages by the application of a resilient fibre insulating blanket, generally with a wall thickness ranging from 25/50 mm, and further covered by a restraining outer sheath with dimensions engineered to accommodate the extra girth required. In this invention, the provision for radial expansion is provided by allowing the flap portions to open as they begin a rotational path about the helical mandrel means. Viewed from the vertical perspective, the separation begins as an apex at the point where the cut line intersects with the internal tube dimension and opens in triangular fashion towards the point where a fold across the top plane of the inner hollow square or rectangular compartment guide means. Across this horizontal plane, the perspective is of a defined parallel gap. The combined sum of the measurement of the flap portions and the corresponding gap portions about one complete orbit of the helixing mandrel means generally defines the circumferential measurement of the outer diameter. For example, if we choose an industry standard size of flex-duct with an ID of 300 mm and a wall height of 25 mm to accommodate a specific thermal insulation means, then the outer wall would carry a diameter of 350 mm (ID of 300 mm+2×25 mm wall sections across the circle).

By applying the equation Pi, it can be seen that the circumference of the ID is approximately (300 mm×3.14) 942 mm. The OD would have a larger measurement of approximately (350 mm×3.14) 1099 mm, a differential of 157 mm. Further in this example, if we choose a cross section width of the strip portions (the spacing between the horizontal cut lines) of 10 mm, it can be demonstrated that as each progressing helix is formed about the helical mandrel means, and the length of the progressing combined substrate formation is limited by progressing at the circumferential measurement of the ID, approximately (to the nearest strip portion width measurement) 94 strip portions occur per revolution. The parallel gap across the horizontal (top) can be measured by dividing the circumferential difference between ID and OD by the number of strip portions (eg 157÷94=approx. 1.7 mm).

A third substrate strip is provided to helically form an outer skin for the advancing combined first and second substrate strips including the formed compartment for the fibrous insulation means. This third substrate ideally may only be attached to the emerging and advancing 'h' profile after the radial opening of the gap portions are apparent. Generally within the field of flex-duct production, helical mandrel means consist of a series of rollers set up in circular fashion to define the approximate ID dimension of issuing tube formations. More particularly, the positioning of the rollers between rear and front plates, which allow for bearings to be employed to ensure smooth rotation, are equidistant and as such the radial bend angle may be determined as the advancing profile passes from the first roller (the top Centre roller) to the second roller. This radial bend angle defines a point where the gap between the strip portions forming the compartment portion stabilises. In practice, for this invention, the second roller position is an ideal location to affix the third substrate to the advancing 'h' profile. A means of providing an adhesive material to the whole of the contact surface of the third substrate material that ideally has a width allowing full coverage of the emerging and advancing helix width and at least coverage of the previous (first completed orbit) formed helix width. In this fashion, the third substrate may be applied by relying on the stability of the first previously formed helix rotation. The application of the third substrate completes the formation of the advancing insulated flex-duct machining process and the tube formation may proceed to a chosen lineal length and be severed. The application of the third substrate as an outer covering sheath further provides a stable compartment formation to contain the insulation means securely. In the preferred manufacturing means of delivering the insulation as loose synthetic fibres, pressure driven by air, it is necessary to secure the compartment space prior to insertion under pressure.

While the above description is the preferred embodiment of the invention, three alternatives embodying the employment of cut strip portions are further described in the adoption of productive means according to the invention, to demonstrate options likely obvious to those skilled in the art.

A first alternative means describes a version limited to two substrate strip portions combining to effect a similar outcome as the preferred embodiment. A substantially wider first substrate strip material is drawn towards a helical mandrel means. A series of strip portions are produced with the aid of a mechanical cutting means (a roller with a series of blades, set in parallel horizontally, placed above the advancing substrate with a corresponding arbour roller placed under and driven by digital controlled motivating means). At the trailing edge, a stable tail portion is provided to allow for self-lamination at the helical mandrel as the substrate progresses. A further stable portion is provided at the leading edge to provide a closure means after the strip portions have been guided over a hollow compartment guide means. As in the original and preferred iteration, the hollow compartment guide means both defines the square or rectangular dimensions of the compartment portion for the loading of a fibrous insulation means to be delivered via an energised air stream carrying the fibres. Further in this iteration, the length of the cut strip portions is sufficient to conduct and guide the portions up, over and down three sides of the hollow compartment guide such that the remaining stable securing portion may be self laminated to the forward portion of the tail portion adjacent to the border of the cut strip portions. The appearance of the emerging profile is of an inverted 'u' sitting on the stable tail portion with the strip appearance emerging on the two vertical walls and topside of the block formation. In this iteration the compartment portion forms a closed loop to contain the fibrous insulation means. A second substrate is employed to provide an outer skin in similar fashion to the original iteration, after the correcting gap is established as circular advancement about the helical mandrel proceeds to the second roller in the circular sequence.

A second alternative means provides for employment of three substrate strip members where a first substrate advances towards a helical mandrel means. The first substrate is applied with a full application of an adhesive bonding material. A second substrate is provided to form the fibrous insulation compartment and has a series of strip portions mechanically provided by cutting means similar to the means described in alternative one above. The width of the second substrate material is sufficient to provide a stable portion approximately the width of the helix spacing on both the leading and trailing edges. The cut strip portions ideally carry sufficient width to fully encompass the two sidewalls and the topside of the hollow compartment guide means.

The trailing edge stable portion overlays the leading edge of the first substrate and is attached by means of contact with the surface applied adhesive of the first substrate. An outer guide means shapes the remaining strip and stable portions to pass over in saddle fashion, the hollow compartment guide means such that the remaining stable portion may attach adjacent and behind the first adhered stable portion. Further in this iteration, while producing a closed loop style of compartment to contain the fibrous insulation material very similar to the first alternative iteration, offers the opportunity to employ a second substrate means with differing technical specifications, or lower cost materials, to the first mentioned alternative means. Further in this second alternative iteration, a third surface-adhered substrate material is provided to form an outer covering sheath to complete the manufacturing process.

A third alternative means employs two substrate strips. A first strip of substrate material is provided with a tail portion of generally two (2) helix widths, preferably with a further margin providing a small overlap of the two previously mentioned helix widths. A further width portion is provided to form strip portions with a measurement accommodating one vertical sidewall measurement and a horizontal outer wall portion preferably ranging between 1.5 and 2 helix widths. In this iteration, the compartment formation of the emerging profile relies on the previously formed helical orbit to provide both the inner wall (the balance of the self-laminating stable portion) and the forward radial sidewall to complete a square or rectangular formation. Further in this third alternative iteration, a second surface-adhered substrate material is provided in similar circumstances to the above-mentioned preferred and alternative means to form an outer covering sheath to complete the manufacturing process.

In all of the above mentioned preferred and alternate means of producing flex-duct in accordance with the invention, the wire reinforcing member is introduced to the tube formation as the stable portion of each first substrate self-laminates as a helical overlay and hence, provides scope to include insertion between layers of helically advancing substrate.

In order that the invention in the preferred and alternative first, second and third alternatives is more readily understood, particular embodiments will now be described by way of example only with reference to a series of drawings.

BRIEF DESCRIPTION OF DRAWINGS

FIG. 1 is a flat overview a first substrate material with adhesive applied to accept lamination of the stable portion of the second substrate in the preferred iteration embodiment, in accordance with the invention.

FIG. 2 is a flat section overview of the second substrate material after the strip cutting process has been applied in the preferred iteration, in accordance with the invention.

FIG. 3 is a three dimensional view of the first and second combined substrates in the original preferred iteration as it would appear after being guided about the hollow compartment guide means to form the profile in accordance with the invention.

FIG. 4a is a is a sectional compartment sidewall view of expanding strip portions in the form of triangular gaps as progression around a helixing mandrel means occurs and application of a third substrate to form an outer covering layer in accordance with the invention. FIG. 4b is a sectional view from above the helixing mandrel means depicting the gaps that appear between the strip portions as orbit rotation commences as between the first and second rollers of the mandrel means.

FIG. 5 is a cross sectional view of a helically formed flexible duct wall construction in accordance with the invention.

FIG. 5a is a side elevation of the hollow compartment guide means.

FIG. 5b is an overhead elevation of the hollow compartment guide means.

FIG. 6 is a flat overview of the first substrate material after the cutting of the strip portions in the first described alternative means of construction in accordance with the invention.

FIG. 7 is a cross sectional view of the profile of the substrate after compartment formation has occurred by guiding the strip and stable securing portions over the hollow compartment guide means of the first described alternative means in accordance with the invention.

FIG. 8 is a cross sectional view of the profile of the second described alternative means after combining the first and second substrates by bonding the first securing portion and passing, with outer guide support the hollow compartment guide means and securing the second securing portion, in accordance with the invention.

FIG. 9 is a flat overview of the first substrate material after the cutting of the strip portions in the third described alternative means of construction in accordance with the second alternative means in accordance with the invention.

FIG. 10 is an isometric view of the progressing first substrate of the second alternative means progressing horizontally towards the helical mandrel means.

FIG. 11 is an overview of the first substrate material of the third alternative means progressing towards the mandrel means.

FIG. 12 is a cross sectional view of the profile of the third described alternative means advancing towards the helixing mandrel means as formed over the inner compartment guide means.

FIG. 13 is a cross sectional view of the helical duct wall employing the third alternative profile structure. FIG. 13 is segmented by layer to illustrate the means of producing a compartment formation to contain fibrous insulation within a radial helical wall structure.

DETAILED DESCRIPTION OF THE DRAWINGS

Referring to FIG. 1, a first substrate material (1) is drawn in the direction of the arrow (2a) towards a helical mandrel forming means (not shown). This first substrate is ideally supplied from a dispensing wound bobbin (not shown) fitted to a dispensing shaft with appropriate bearings and restraints (also not shown). Preparing and supplying substrate of specific materials and widths on pre-wound bobbins is the normally accepted commercial means of supply. A coating of adhesive (2) is applied to the surface of the first substrate (1) by adhesive applicator (3). The width of the coating of adhesive (2) should approximate the helix distance occurring in each complete orbit of the helical mandrel means in the later formation to a tube (particulars depicted in FIG. 3). A non-adhesed tail portion of the first substrate (4) is provided to form the self-laminating element at tube formation. A second adhesive applicator (not shown) is provided closer to the helical mandrel means (not shown) to apply a coating to the tail portion (4) of the first substrate (1) to provide self bonding of the progressing over lapping helixing formation. Ideally, the width of tail portion (4) of the first substrate (1) is at least the width of two helix distances, which occur, in a complete orbit of the helical mandrel means. The total width of the first substrate material (1) is defined by leading edge (2b) further defined by the forward helix advancement of a tube formation after further processing (not shown). Trailing edge (2c) defines the outer width point of tail portion (4) provided to comprise an inner laminated helix wall structure of an emerging tube formation (not shown here).

Referring to FIG. 2, a second substrate material (5) is drawn in the direction of the arrow (2a) towards a helical mandrel means (not shown). After passing through mechanical cutting means (10) two distinct portions are apparent. Portion (6) depicts a stable portion between boundary line (8) and the leading edge (11) and portion (7) is defined by a series of strip portions with parallel cut lines emanating from the trailing edge (9) to boundary line (8). Stable portion (6) is of similar width to adhesed portion (2) in FIG. 1. Preferably, second substrate material (5) is being drawn to the helical mandrel means (not shown) such that stable portion (6) may be laid down and affixed to adhesed portion (2) in FIG. 1.

Referring to FIG. 3, first substrate (1) is drawn in the direction of the arrow (2a) towards a helical mandrel means (not shown). The stable portion (6) of the second substrate (5) has been bonded to adhesive portion (2) of the first substrate (1) via a compression roll (not shown). According to the preferred means of producing flex-duct in this invention, a hollow compartment guide means (12) is provided to allow the strip portions of portion (7) of the second substrate material (6) to be guided by an outer guide means (not shown) to form a vertical wall (13) from the boundary line (8) of portion (7) to a roll position (14) at which point the remaining segment of portion (7) lays across the top horizontal wall of the hollow compartment guide means (12).

The exterior dimensions of hollow compartment guide means (12) define, with a degree of processing tolerance, the internal dimensions of a compartment portion to accommodate the loading of fibrous insulating material within. The dimensions of the compartment are generally determined by external criteria not specific to the invention. Product specifications, for example, building code requirements for specific thermal protection of conditioned air passing through flex-duct and wall thickness preferences of contractors installing flex-duct. The exterior dimensions of hollow compartment guide means (12) may be square or rectangular in form and engineered in a variety of sizes to accommodate market driven demands. Ideally, the strip portions of portion (7) have a length suitable to provide extended portion (15), which has a margin of length in excess of the measurement of stable portion (2) and extends outwardly on ledge portion (16) of the hollow compartment guide means (12).

Referring to FIG. 4a, helical mandrel means (17) with a series of driven rollers (18) set with bearings (not shown) within a back plate (not shown) and a forward plate (not shown) and an internal or external mechanical motivation drive means (not shown) providing forced rotation in the direction of rotation direction arrow (21). The perspective sectional view provided by FIG. 4a is taken from the rear of the helical mandrel means (17) defined by the trailing edge (2c) of the first substrate material (1) of FIG. 3 and further depicts the sidewall (13) of the second substrate strip portions of portion (7) of second substrate (5) of FIG. 2. By way of clearer definition, the tube portion helically formed by the mandrel means (17) would be helixing in rotational forward motion away from the perspective shown.

Hollow compartment guide (12) continues to support sidewall (13) in lineal motion of arrow (2a) towards the helical mandrel means (17). In the preferred production iteration of the invention, hollow compartment guide (12) continues to provide guide support for sidewall (13) and the horizontal topside portion (7) of second substrate (5) (FIG. 2) to a point directly above the second roller (20) of mandrel means (17). As such, hollow compartment guide (12) is formed to a partial curve (22) between a point perpendicular from the top centre of top centre roller (19) to at least the top angular centre of second roller (20).

As sidewall strip portions (7) curve to the circular path of the helical mandrel means (17) cut lines (7a) segmenting the strip portions (7) which appear parallel until reaching the top centre of top centre roller (19) separate to form triangular gaps (23). At the apex of the triangle gaps (23) there is no material stress as the helical mandrel means (17) is drawing sufficient rotational length of the first and second substrate combined (adhered) materials (1) of FIGS. 1 & (5) of FIG. 2, to form a two dimensional interior diameter of the tube formation progressing. The triangular gaps (23) appear according to the explanation provided between line 1, page 4 and line 2, page 5.

Referring to FIG. 4b, first substrate material (1) combined adhesively with second substrate material (5) is travelling in the direction of arrow (2a) towards helical mandrel means (17). Whereas FIG. 4a depicted strip portions of portion (7) of second substrate (5) placed vertically adjacent to trailing sidewall of hollow compartment guide means (12), the perspective overview down of FIG. 4b depicts strip portions (7) laid across the top horizontal wall of hollow compartment guide means (12). While helical mandrel means (17) does not depict the mechanical drive means or the forward and rearward plates and bearings that provide location, rotate-ability and motion drive, helix angle (24) does define the helix angle which provides the formation of a substrate to rotate-ably form a tube means in accordance with this invention and previous iterations within the art of helical tube flex-duct and other helical tube forms. Helical mandrel means (17) draws the full width first substrate material (1) with the attached compartment formation of second substrate (5) such that (in this depiction) rotation of the helixing tube formation is in clockwise rotation as shown by arrow (21). While the combined three-dimensional substrates (1 & 5) travel in a level path plane (in this depiction a level horizontal path plane), strip portions (7) of second substrate (5) remain unstressed. In these circumstances, the cut lines (7a) dividing the strips of strip portion (7) remain in close parallel proximity to each individual strip portion of strip portion (7). To accommodate the differential in circumferential length between the inner diameter of the tube formation and the outer diameter of the triangular gaps (23) of FIG. 4a that occur and stabilise across partial curve (22) between top centre roller (19) and second roller (20), strip portions (7) revert to parallel gap portions (35) when the plane reorients to the horizontal circumferential as seen in FIG. 4b.

In the horizontal plane depiction of FIG. 4b, top centre roller (19) and second top centre roller (20), are viewed from above, turned 90 degrees from the end-on perspective of FIG. 4a and appear as parallel rotating shafts. For the purposes of indicating a nominal interior diameter, 3 random circular rollers (18) appear including a third centre roller, a roller defining a 3 o'clock position (18a) and a roller defining a 9 o'clock position (18b). Boundary lines (25 & 26) define the position at which rear and front plates (not shown) are ideally machined to accommodate the rotating shafts (18, 19 & 20) and suitable bearing means to allow motivation and rotation (not shown).

Helix angle (24) is ideally calculated and set with adjustable support means (not shown) for the helical mandrel means (17) such that the compartment formation dimensions formed by strip portion (7) of second substrate material (2) of FIG. 2 are generally equal to the lineal length of tube formation issuing with each complete orbit of helical mandrel means (17) by the combined substrate materials (1 & 5). (For simplicity purposes, the width of the formed compartment is ideally equal to the helix width.) Once strip portions (7) of second substrate (5) are formed about hollow compartment guide means (12) of FIG. 3, tail portion (4) of first substrate material (1) is ideally coated with an adhesive substance by adhesive applicator (27). Tail portion (4) of first substrate material (1) is ideally at least two helix widths wide such that as helical rotation proceeds, ample width is provided to secure ongoing helical lamination. Referring again to FIG. 3, extended width portion (15) of strip portion (7) of second substrate material (5) is ideally provided along and supported by extending support platform (16) of hollow compartment guide means (12). The purpose of extended width portion (15) is to provide a closure means for the compartment to accommodate a fibrous insulation means contained within the internal confines of the compartment of formed second substrate material (5) after guiding strip portion (7) to the three sided square or rectangular shape evident in FIG. 3. FIG. 4a depicts roller means (28) applying a third substrate material (29) following the formation of gap spaces (23) as strip portion (7) is drawn helically and rotate-ably about helical mandrel means (17).

FIG. 5 is provided to illustrate the advancing wall structure of the flex-duct in a horizontal cross-sectional aspect. Tail portion (4) of first substrate (1) is defined as, ideally, approximately two helix widths between measurement border (28). Adhesive portion (2) (FIG. 2) of first substrate material (1) lies directly under stable portion (6) of second substrate material (5) defined as measurement portion (30). Measurement portion (34) defines the lamination overlap of tail portion (4) of substrate material (1) after a rotation of the mandrel means (17) occurs. Extended portion (15) of strip portion (7) overlays the formed compartment of strip portion (7) of the previous first complete helical orbit of helical mandrel means (17) shown in FIG. 4b, defined as measurement portion (31). Third substrate material (29) is applied as width portion (32) and is ideally equal to two helix widths. As the helix width is ideally similar to the compartment formation formed by strip portion (7) of second substrate (5) over stable portion (8) of second substrate (5) and, in turn, similar to adhesive portion (2) of first substrate (1), measurement portion (30) generally defines one helix width of the advancing tube formation. In these circumstances, extended portion (15) of strip portion (7) advances towards mandrel means (17) such that extended portion (15) overlays third substrate material (29) that in turn overlays the formed compartment of strip portion (7) of the first previous helix formation. Referring again to FIG. 4a, it can be observed that, ideally, third substrate material (29) is applied to compartment formation formed by strip portion (7) adjacent to second top roller following stabilisation of triangular gap formations (23) (as disclosed in FIG. 4a) following helical rotation through arc curve (22). In these circumstances, horizontal parallel gap formations (35) are closed by the lamination application of the third substrate (29) providing secure retention of the fibrous insulation means provided within. The application and helical lamination of third substrate material (29) complete the construction of the preferred iteration of the flexible duct within the described invention.

FIGS. 5a, 5b, 5c & 5d generally depict the elements of hollow compartment guide means (12) and outer forming guide means to guide strip portion (7) of second substrate (5) of FIG. 2 to the compartment formation depiction of FIG. 3. Generally within the prior art, and those skilled in the art of flexible duct production, other productive elements and means of producing flexible duct are well known. The preferred means of producing flexible duct according to the invention rely more particularly on providing guide means according to FIGS. 5a, 5b, 5c & 5d.

Referring to FIG. 5a, hollow compartment guide means (12) is depicted in side elevation with straight portion (35) and curved portion (36). The substrate materials (1 & 5) (not present in FIG. 5a) are drawn towards helical mandrel means (17) in the direction of arrow (2a). Generally, hollow compartment guide (12) is an enclosed square or rectangular configuration, sized in exterior dimensions to form a three sided compartment formation from strip portion (7) of second substrate (5), suitable for enclosing fibrous insulation to particularised specification, with appropriate tolerances.

Straight portion (35) has a square or rectangular entry port (37) to allow fibrous insulation means (not shown) propelled by pressurised air to pass through the hollow chamber of hollow compartment guide (12). Curved portion (36) is provided to guide and support strip portion (7) as seen in FIG. 4a to allow gap portions (23) of strip portion (7) to open and stabilise during radial passage about helical mandrel means (17) more particularly across partial curve (22). Ideally, the application of third substrate (29) by roller means (28) to the strip portion (7) occurs at or within the close proximity of termination point (38) of curved portion (36) of hollow compartment guide means (12).

FIG. 5b depicts hollow compartment guide (12) in top elevation. Square or rectangular entry port (37) depicted at 5ba, is provided for passage of fibrous insulation fibres (not shown) carried by a stream of propelled air or other gas into the forming compartment of strip portion (7) of FIG. 3 as rotation commences about helical mandrel means (12) depicted in FIGS. 4a & 4b. As depicted in FIG. 3, a formed compartment, comprising stable portion (6) of second substrate material (5) as lower horizontal wall across measurement portion (30) and strip portion (7) providing rear vertical wall at vertical fold line (8) through to horizontal fold line (14) where strip portion (7) terminates at the leading edge of extended portion (15). By reference to FIG. 5 it can be observed that the compartment formation of substrate (5) consists, when so formed, of a forward-facing open channel formation bounded by measurement portion (30). Extended portion (15), however, extends over and above the vertical wall portion (13) rear of the now complete first previous helical rotation about mandrel means (17) as observed at (41) noted on FIG. 4b. As further observable in FIGS. 4a & 4b, third substrate (29) and applied across at least width portion (32), (observable at FIG. 5), entraps extended strip portion

(15) of strip portion (7) and gap portions (23) between the adhered surface of third substrate material (29) and the completed layer of third substrate material (29) available by continuing helical formation. In these circumstances of continuing helical formation, vertical wall portion (13) of the previously formed helical rotation provides an abutting closure means for the three sided compartment formation of second substrate material (5). Exit port (40), more accurately depicted in detail FIG. 5bc of FIG. 5b, provides a means of depositing fibrous insulation fibres within the compartment portion comprising second substrate material (5) at similar moment to the application of third substrate material (29) that, in turn, secures the outer wall of strip portions of strip portion (7) of second substrate material (5). Curved portion (36) seen in the top elevation of 5b is a parallel perspective.

Referring to FIG. 6, first substrate (41) forms the basis of a first alternative means of constructing an insulated three-dimensional flexible duct tube means formed in a single machine sequence according to the invention. In this first alternative means, only two substrate material means are required to complete the construction of the flexible duct means. Mechanical strip-cutting device (42) is provided to mechanically cut measurement portion (44) into a series of strip formations along compartment portion (46). Measurement portion (44) is calculated, with appropriate production tolerance, to produce a suitable length to allow guidance means to guide strip portion (46) about the two vertical and top horizontal wall of square or rectangular hollow compartment guide means (12) of FIGS. 5a & 5b. Measurement portion (43) is calculated to provide tail portion (47) preferably 2 or more helix widths of a tube formation to ensure encapsulation of a reinforcing wire inserted between layers of tail portion (47) as helical lamination occurs to ensure roundness integrity of the tube formation. Measurement portion (45) is calculated to provide stable portion (48) providing a securing closure means for compartment portion (46) following guidance about square or rectangular hollow compartment guide means (12) of FIGS. 5a & 5b. First substrate (41) is being drawn towards a helical mandrel means (17) of FIG. 4a in the direction of arrow (2a).

FIG. 7 depicts first substrate material (41) continuing to be drawn towards mandrel means (17) of FIG. 4a in the direction of arrow (2a). Generally FIG. 7 is in isometric form segmented from a cross-sectional perspective through the compartment formation of strip portion (46), tail portion (43) as measured by width portion (43) and stable portion (48) affixed to tail portion (47) by means of adhesive (not shown) applied to facilitate a secure bond. First substrate (41) differs from the preferred iteration of FIGS. 1/5b, in that measurement portion (49) of tail portion (41) and strip portion (46) combine, when guided about hollow compartment guide means (12) of FIG. 5a and stable portion (48) is securely adhesively fixed to tail portion (47) of FIG. 6, a fully enclosed compartment that does not rely on other means to contain the fibrous insulation means. As such, a second substrate may be applied to form an outer covering means as the applied physics of helical rotation and the emergence of gap formations between top roller (19) and second top roller (20), generally across radial portion (22), all of FIG. 4a, and such second substrate substitutes for third substrate (29) of FIG. 4a. Note that in these circumstances, each abutting vertical sidewall of the formed compartment of strip portion (46) of FIG. 6 is a twin wall.

Referring to FIG. 8, first substrate material (50) is drawn towards a helical mandrel means in the direction of arrow (2a) and forms the basis of a second alternative means of producing flexible duct according to the invention. Preferably, first substrate (50) is at least ⅔ width portions of the helix width of a helically emerging tube formation issuing from the mandrel means.

Referring to FIG. 9, second substrate (51) is drawn towards a helical mandrel means in the direction of arrow (2a). Mechanical strip cutting device (55) is provided to cut width portion (57) into a series of strip formations forming strip portion (52). Width portion (57) is provided to form a compartment means similar to the compartment of FIG. 7. Width portion (56) is preferably approximately one helix width comprising stable portion (53) and width portion (58) is preferably of a suitable width to form a firm attachment adhesively with first substrate (50).

FIG. 10 depicts an isometric perspective beginning from a cross sectional view of first substrate material (50) and second substrate material (51) after being formed by outer guidance means (not shown) about hollow compartment guidance means (12) of FIGS. 4a & 4b. Stable portion (58) is attached to first substrate (50) by application of adhesive means applied across the surfaces of measurement portions (56 & 58). Stable portion (53) is secured adhesively at measurement portion (56) after guidance of strip portion (52) to a compartment formation. It will be noted that the outcome of this second alternative means of constructing a compartment formation of substrate materials (50 & 51) is similar in format to first alternative means described at FIGS. 6 & 7. In production this second alternative means provides options to employ differing substrate materials, for economic or technical outcome purposes, as may be specified for substrate materials (50 & 51). Further in FIG. 10, helical formation about helical mandrel means (17) and the application of third substrate material (29) of FIGS. 4a & 4b is identical in format, to complete the flexible duct of the second alternative means, according to the invention.

Referring to FIG. 11, first substrate (60) is advancing in the direction of arrow (2a) towards helical mandrel means (not shown) and forms the basis of a third alternative means of producing flexible duct in accordance with the invention. After passing through mechanical cutting means two distinct portions emerge. Measurement portion (62) defines a stable portion (70) between trailing edge (67) and boundary line (69) preferably of a width marginally exceeding two helix widths of an emerging flex-duct. Stable portion (70) is provided to form the inner diameter tube formation after adhesive material is applied sequentially (not shown) to allow stable portion (70) to self-laminate helically about the mandrel means. Measurement portion (63) is provided to form strip portions (66) between boundary (69) and leading edge (68) comprising sidewall portion (65) and top wall (64).

Referring to FIG. 12, first substrate (60) is advancing in the direction of arrow (2a) as formed over a square or rectangular hollow guide means (not shown) towards the helical mandrel means (not shown). Stable portion (70) remains horizontal and perpendicular in advancing towards the helical mandrel means. Sidewall (65) has been formed to a vertical plane with the provision of an outer guide (not shown) preferably to a height designed to accommodate a calculated 'R' or thermal rating of the completed flex-duct. Sidewall (65) comprises a sub-portion of measurement portion (63) in turn comprising strip portions (66). Top wall (64) comprises the balance of measurement portion (63) extending horizontally to leading edge (68) preferably having a width of between 1.5 and 2 helix widths of the emerging flex-duct.

Referring to FIG. 13, first substrate (60) of third alternative means is shown as the profile of FIG. 12 meeting the previously formed helix at top Centre of the helixing mandrel means (not shown). Adhesive portion (60a) represents the remaining portion of stable portion (70) of FIG. 12 that has an adhesive surface facing the overlaying and continuously drawn profile of FIG. 12. As stable portion (70) is preferably marginally more than two helix widths, adhesive portion (60a) presents a width of marginally more than one helix width for self laminating by adhesed overlaying on a continuing helical formation. More particularly, as first substrate (60) completes one revolution about the helical mandrel means, being of preferably marginally more than two helix widths, exactly one helix width (71) is advanced. Second substrate (72) is provided to form an outer sheath wall at a point preferably past the second radial roller of FIG. 4a. In FIG. 13, second substrate (72) is shown separated for illustrative purposes and is, in reality, adhesively attached as the outer sheath. Further, Helix portion (73) provides a bottom wall (74) as seen in the next advancing helix at (71). Sidewall (65a) illustrates the position of sidewall (65) of FIG. 12 at the completion of one helical rotation and provides encapsulation and closure of the compartment means evident at helix distance (71) and (73). In this manner the compartment may be filled with a fibrous insulation loading similar to the preferred and first and second alternative means according to the invention.

What is claimed is:

1. An insulated flexible duct of generally three dimensions, formed helically and sequentially in one machining process comprising;

A first substrate material provided with an adhesive means along a leading edge to attach a second substrate and a tail portion, said tail portion including a plurality of layers;

A wire reinforcement member inserted between layers of the tail portion of the first substrate;

A second substrate comprising a stable portion and a series of horizontal strip portions, wherein the stable portion is adhesively attached above the leading edge of the first substrate and the horizontal strip portions are shaped to an insulation compartment means to contain an insulation means;

A series of gap portions imparted to separate the horizontal strip portions;

An insulating means provided to occupy the insulation compartment means and;

A third substrate material of two helix widths provided with an adhesive means to form an outer skin.

2. A flexible duct according to claim 1 wherein the insulation compartment means, comprised of the horizontal strip portions, includes radial sidewalls formed by a measured portion of said horizontal strip portions.

3. A flexible duct according to claim 1 wherein the first substrate material has a tail portion of two helix widths to helically self-laminate, with the aid of applied adhesives.

4. A flexible duct according to claim 1 wherein the tail portion of said first substrate material is of two helix widths to encapsulate and contain the wire-reinforcing member.

5. A flexible duct according to claim 1 wherein the first substrate material is provided with an adhesive along a margin width approximating one helix width along the leading edge of said first substrate material, providing a means of securing the stable portion of the second substrate affixed directly above.

6. A flexible duct according to claim 1 wherein the horizontal strip portions of the second substrate material, formed to said insulation compartment means, comprise a radial vertical sidewall portion, a horizontal top wall portion and an extending portion providing a securing means.

7. A flexible duct according to claim 1 wherein the horizontal strip portions are formed to said insulation compartment means by a machine guidance system of generally toleranced dimensions of the interior of the insulation compartment means so formed.

8. A flexible duct according to claim 1 wherein the application of the third substrate material occurs after the gap portions separating the horizontal strip portions forming the insulation compartment means have been imparted.

9. A flexible duct according to claim 1 wherein said insulation means comprises insulation fibre in the form of a continuous sliver.

10. A flexible duct according to claim 1 wherein the circumferential difference, between the inner diameter and outer diameter is imparted by the gap portions separating the horizontal strip portions comprising the insulation compartment means, to make up that circumferential difference.

11. An insulated flexible duct of generally three dimensions, formed helically and sequentially in one machining process comprising;

A first substrate material provided with a rear edge tail portion, said rear edge tail portion having a plurality of layers secured by applied adhesive, a series of horizontal strip portions shaped to provide an insulation compartment means to contain an insulation means, and a forward edge stable portion secured adhesively to the tail portion;

A series of gap portions imparted to separate the horizontal strip portions;

A wire reinforcing member inserted between layers of the tail portion;

An insulation means provided to occupy the insulation compartment means;

A second substrate material of two helix widths provided with an adhesive to form an outer skin.

12. A flexible duct according to claim 11 wherein the tail portion of the first substrate is provided to self-laminate helically with applied adhesive.

13. An insulated flexible duct of generally three dimensions, formed helically and sequentially in one machining process comprising:

A first substrate material provided with an adhesive means along a leading edge to attach a second substrate, and a tail portion, said tail portion including a plurality of layers;

A wire reinforcement member inserted between layers of the tail portion of the first substrate;

A second substrate material comprising a trailing edge stable portion attached adhesively above the leading edge of the first substrate material; a series of horizontal strip portions shaped to an insulation compartment means and a leading edge stable portion adhesively attached to the tail portion of the first substrate material to secure the insulation compartment means;

A series of gap portions imparted to separate the horizontal strip portions;

An insulating means provided to occupy the insulation compartment means and;

A third substrate material of two helix widths, provided with an adhesive to form an outer skin.

14. A flexible duct according to claim 13 wherein the tail portion of the first substrate material is provided with an applied adhesive to self-laminate adhesively and contain and encapsulate the wire reinforcing means.

15. A flexible duct according claim 13 wherein the second substrate comprising a leading edge stable portion, a second stable portion at the trailing edge and a series of horizontal strip portions is provided to form the compartment means to contain the insulation means comprising two vertical wall portions and one top wall portion.

16. A flexible duct according to claim 13 wherein the horizontal strip portions form the insulation compartment means of generally closed loop formation.

17. A flexible duct according to claim 13 wherein the second substrate material may be of differing material to provide economic or technical advantages to the flexible duct outcome.

18. A flexible duct according to claim 13 wherein the insulation means and the dimensions of the insulation compartment means may be varied to suit market demands or building code requirements.

19. A flexible duct according to claims 13 wherein the substrate materials may be varied to accommodate market demands or building code requirements.

20. A flexible duct according to claim 13 wherein the substrate materials may be laminated or pre-manufactured with metallised or reflective surfaces to enhance thermal protection.

21. An insulated flexible duct of generally three dimensions, formed helically and sequentially in one machining process comprising;

A first substrate material provided with a rear edge tail portion, said rear edge tail portion having a plurality of layers secured by applied adhesive and a series of horizontal strip portions shaped to an insulation compartment means to contain an insulation means;

A series of gap portions imparted to separate the horizontal strip portions;

A wire reinforcing member inserted between layers of the tail portion;

An insulation means provided to occupy the insulation compartment means and;

A second substrate material of two helix widths provided with an adhesive to form an outer skin.

22. A flexible duct according to claim 21 wherein the wire reinforcing member is inserted between layers of the tail portion of the first substrate material to form an inner diameter of a helical tube formation.

23. A flexible duct according to claim 21 wherein the horizontal strip portions of the first substrate are shaped to the insulation compartment means comprising a vertical sidewall, a horizontal top wall and an extended securing portion.

24. A flexible duct according claim 21 wherein the tail portion forms an inner diameter closure of the insulation compartment means.

25. A flexible duct according to claim 21 wherein a portion of the horizontal strip portions comprise the vertical radial sidewalls.

26. A flexible duct according to claim 21 wherein one or both of the substrate materials may be laminated or pre-manufactured with metallised or reflective surfaces to enhance thermal protection.

* * * * *